Jan. 27, 1959    W. J. COULTAS    2,870,852
HITCH FOR SERIES-CONNECTED IMPLEMENTS
Filed Aug. 9, 1957    2 Sheets-Sheet 1
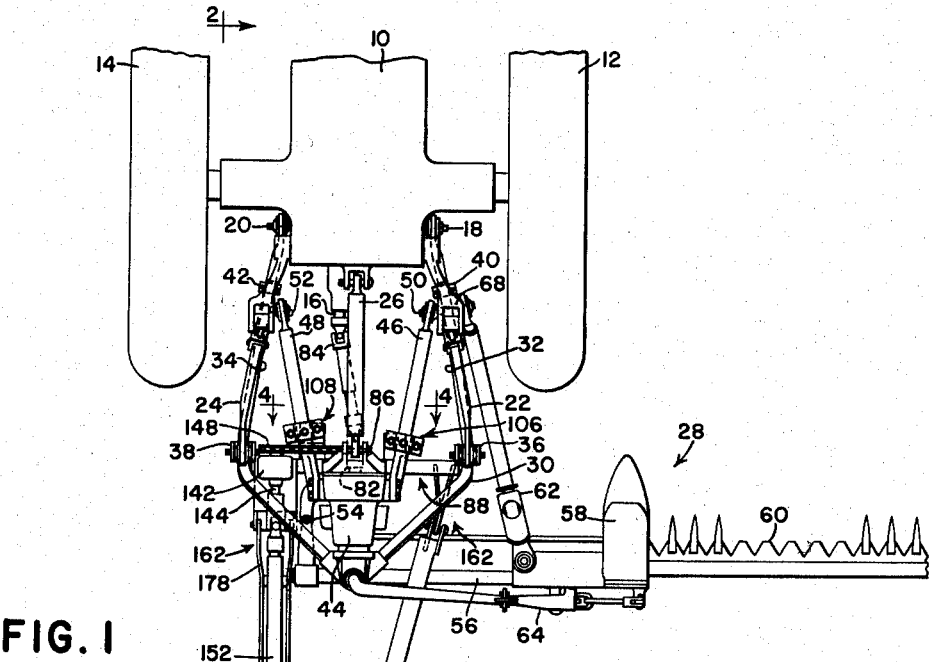
FIG. 1
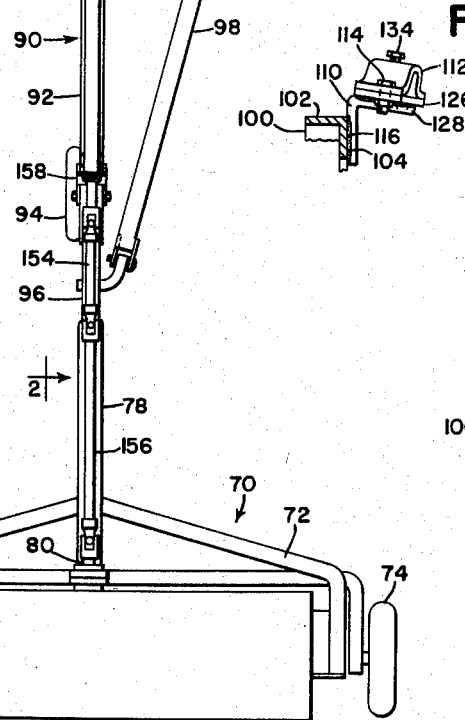
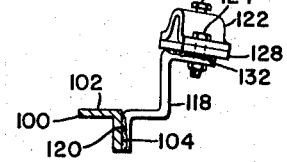
FIG. 5
FIG. 6
INVENTOR.
W. J. COULTAS Jan. 27, 1959 W. J. COULTAS 2,870,852
HITCH FOR SERIES-CONNECTED IMPLEMENTS
Filed Aug. 9, 1957 2 Sheets-Sheet 2

INVENTOR.
W. J. COULTAS

United States Patent Office 2,870,852
Patented Jan. 27, 1959

2,870,852

HITCH FOR SERIES-CONNECTED IMPLEMENTS

Wilbur J. Coultas, Moline, Ill., assignor, by mesne assignments, to Deere & Company, a corporation of Delaware Application August 9, 1957, Serial No. 677,315

6 Claims. (Cl. 180—14)

This invention relates to an agricultural implement hitch and more particularly to a hitch for serially connecting a drawn implement to a tractor-drawn implement.

The invention finds particular utility in connecting a hay conditioner to a tractor-mounted mower. The several considerations involved include trailing the conditioner in offset relationship to the mower and driving the conditioner from the tractor power take-off. The latter aspect entails the inclusion of means for adapting the tractor power take-off to drive both the mower and the conditioner.

The invention features the provision of a novel hitch which may be readily attached to the mower without modifying the mower structure. Another object of the invention is to provide means on the hitch means for adapting the tractor power take-off to drive both the mower and the conditioner. In its over-all aspects, the invention features the provision of a simple and economical hitch, one that is readily adapted to mass production and one that adapts itself to convenient use in the field, being readily attachable to and removable from the mower.

The foregoing and other important objects and desirable features inherent in and encompassed by the invention will become apparent as a preferred embodiment thereof is disclosed in detail in the ensuing specification and accompanying sheets of drawings, the several figures of which are described immediately below.

Fig. 1 is a plan view of the tractor-mower-conditioner organization.

Fig. 5 is a section as seen along the line 5—5 of Fig. 3.

Fig. 6 is a similar section as seen along the line 6—6 of Fig. 3.

Figure 2:
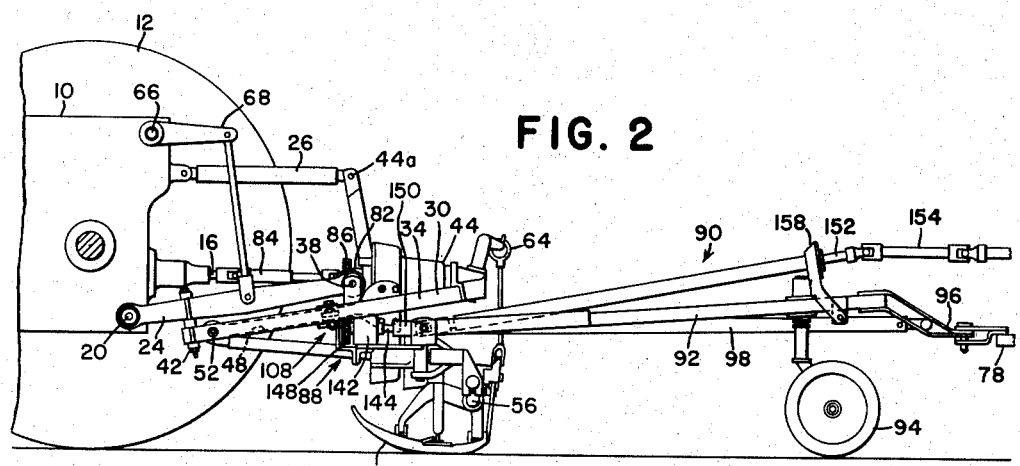
Fig. 2 is a side elevation, partly in section, as seen along the line 2—2 of Fig. 1.

The tractor-mower-conditioner organization is chosen as representative of a tractor-mounted or tractor-drawn implement to which a second implement is serially connected.

The basic part of the tractor is shown as including a main body 10 carried on right and left hand traction wheels 12 and 14 and having a rearwardly extending, centrally located power take-off shaft 16. The rear portion of the body, as is typical of agricultural tracts in general, affords a pair of attaching points or pivots at 18 and 20, and these pivots support laterally spaced apart trailing draft links 22 and 24. These links, together with a top link 26, establish a three-link hitch system for connecting various types of implements to the tractor.

In the particular instance illustrated, a mower, designated in its entirety by the numeral 28, represents a tractor-mounted implement having a main frame 30 including right and left hand fore-and-aft extending supporting members 32 and 34 respectively connected in any suitable fashion to the draft links 22 and 24. Typical of the means by which the frame 30 is connected to the draft linkage are rear connectors 36 and 38 and front connectors 40 and 42. Associated with the frame 30 is a secondary frame including a centrally located housing 44 having a central connection 44a to the top link 26 and also having right and left hand fore-and-aft extending supporting members 46 and 48. These are pivotally connected to forward portions of the side supporting members 32 and 34 at pivot points 50 and 52.

The housing 44 includes means 54 pivotally supporting a laterally extending drag bar 56 for the mower 28, and at its outer or right hand end the drag bar 56 has a mower shoe of conventional construction, at 58, from which a cutter bar 60 extends rightwardly. As is typical of mowers in general, the pivot means 54 affords a pivot point about which the cutter bar can swing rearwardly when it encounters an obstruction. The normal operating position of the cutter bar, as shown, is maintained by a releasable coupling 62. Lift linkage for raising and lowering the cutter bar is designated generally at 64 and this is powered from a tractor-mounted rockshaft 66 through conventional lift linkage 68.

The construction thus far may be taken as representative of mowers in general, even though the particular type of mower shown is of special construction. Nevertheless, so far as concerns the inventive hitch, the fore-and-aft supporting members 46 and 48 establish means whereby the hitch may be connected to the mower and may afford means for connecting a hay conditioner designated in its entirety by the numeral 70. A conditioner of the character illustrated forms the subject matter of U. S. Patent 2,711,622 to Cunningham, but the details are not material.

The conditioner illustrated comprises a transversely elongated main frame 72 carried on right and left hand wheels 74 and 76 and having a forwardly extending draft tongue 78. As will be clear from the Cunningham patent, the conditioner includes a pair of rolls through which the previously harvested swath passes for treatment to facilitate curing. The conditioner rolls are driven by a drivable part 80, herein represented by an input shaft which ultimately is driven from the power take-off shaft 16.

The cutting mechanism of the mower is driven from means in the mower housing 44 via an input shaft 82 which is driven from the tractor power take-off 16 by a propeller shaft 84. In order that the input shaft 80 of the hay conditioner may be driven from the tractor power take-off shaft, the mower input shaft 82 is equipped with a drive member in the form of a sprocket 86.

The basic hitch for the connection of the hay conditioner to the mower comprises a hitch element 88 and a trailing intervening hitch portion 90 which affords on the element 88 means for effecting a towing connection to the second implement as represented by the conditioner 70. The means 90 comprises a fore-and-aft trailing hitch bar 92 having its rear end supported by a caster wheel 94 and further having at its rear end a clevis 96 for connection to the draft tongue 78 of the hay conditioner. A forwardly diverging brace bar 98 provides a second member connected to the hitch element 88.

Figure 4:
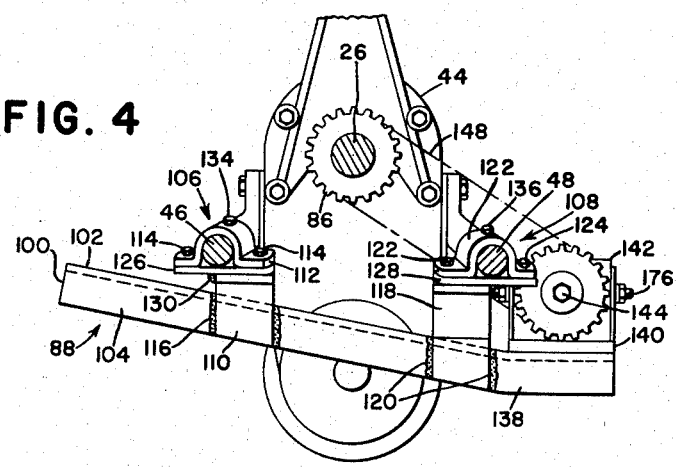
Fig. 4 is an enlarged transverse section as seen along the line 4—4 of Fig. 1.

The hitch element 88 comprises a transverse angle bar 100 having top and front faces 102 and 104 respectively, and this bar is of sufficient length to span the mower supporting members or bars 46 and 48. For this purpose, the bar 100 has thereon a pair of laterally spaced attaching means 106 and 108 for detachable connection respectively to the support members 46 and 48. The right hand attachment means includes a portion or bracket 110 on the hitch element bar 100, plus a detachable cap 112 of inverted U-shape detachably connected to the bracket 110 as by a pair of bolts 114. The bracket 110 is of inverted L-shape and is rigidly secured to the bar 100, as by being welded thereto at 116. As best shown in Fig. 4, the hitch element is mounted on the bars 46 and 48 with the attachment means 106 and 108 embracing and detachably secured respectively to the bars 46 and 48. The left hand attachment means 108, like the right hand means 106, is similarly constructed, having a portion or bracket 118 welded to the front face 104 of the hitch bar 100 at 120 and rising therefrom and bent forwardly to cooperate with an inverted U-shaped cap 122 which is removably secured to the bracket 118 by a pair of bolts 124. Lateral stability of the brackets 110 and 118 is improved by the intervention of lateral members 126 and 128 respectively. These members are preferably welded at 130 and 132 respectively to the tops of the brackets 110 and 118. The shape of the bar 100 is such as to dispose its left hand portion at a level lower than that of its right hand portion, and for this reason the height of the bracket 118 exceeds that of the bracket 110. Nevertheless, the two attachment means 106 and 108 are at the same level for respectively embracing the mower supporting bars 46 and 48. When the hitch element or structure 88 is mounted on the bars 46 and 48, which is accomplished by removing at least one of the cap screws 114 and 124 and replacing them, forward displacement of the element 88 relative to the mower is prevented by the use of means in the form of right and left hand set screws 134 and 136 received respectively in the caps 112 and 122. Since the bars 46 and 48 diverge rearwardly, the tightened set screws prevent binding of the element 88 on the bars because of draft forces applied thereto.

Figure 3:
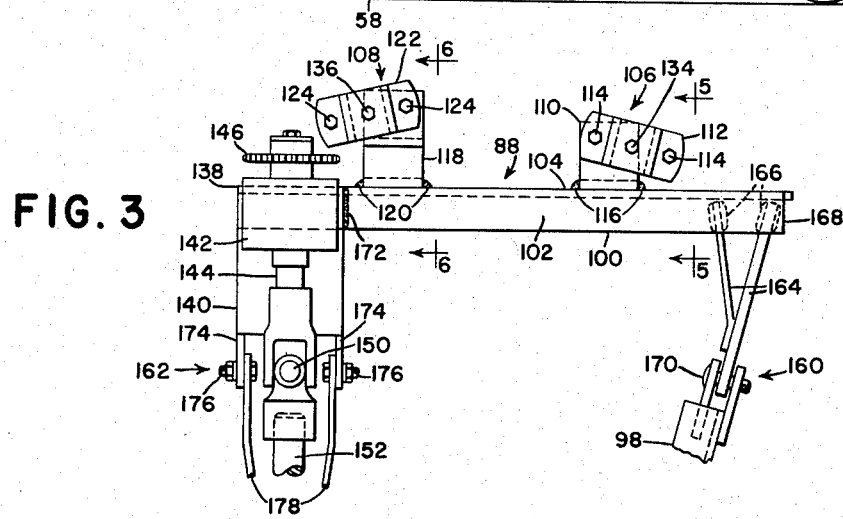
Fig. 3 is a plan view of the basic hitch element by itself.

The hitch and brace bars of the intermediate hitch means 90 are pivotally connected to the hitch element 88 by means to be presently described. As best shown in Figs. 3 and 4, the opposite end portions of the bar 100 project respectively outwardly of the mower supporting bars 46 and 48 and the left hand projecting portion includes means in the form of a rearwardly extending horizontal plate 140 which supports a journal box or bearing 142 in which a short shaft 144 is journaled. The forward end of the shaft projects ahead of the bearing 142 and has a sprocket 146 keyed thereto. This sprocket is connectible by drive means including a chain 148 to the mower input sprocket 86. The rear end of the shaft 144 is connected by a universal joint 150 to the forward end of a rearwardly extending propeller shaft 152 which is connected at its rear end by a universally jointed coupling connection 154 to an input propeller shaft 156 which is in turn connected to the hay conditioner input shaft 80. The rear end of the shaft 152 is journaled in and supported by a bracket 158 at the rear end portion of the hitch bar 92. The universal joint connection at 150 is separable so that the hay conditioner may be disconnected from the hitch element 88 at right and left hand attaching means 160 and 162. These are designated generally in Fig. 1 but are shown and described in detail relative to Fig. 3.

The right hand means 160 includes a pair of members 164 welded at 166 to a right hand end portion 168 of the transverse hitch bar 100 and connected by a removable pin 170 to the front end of the intermediate hitch brace bar 98. The bearing mounting plate 140 at the left hand end 140 of the hitch bar 100 is welded at 172 to the bar 100 and has a pair of rearward extension ears 174 which are pivotally connected by bolts 176 to a pair of straps 178 at the forward end of the hitch bar 92. As will be seen, the horizontal pivot axis established by the bolts 176 is substantially coincident with the center of the universal joint 150. Moreover, the pivot at 170 is substantially transversely alined with the pivot at 176—176. This affords proper articulation of the intermediate hitch 90 relative to the hitch element 88 without disturbing the drive connection between the shafts 144 and 152.

Separation among the mower, intermediate hitch 90 and conditioner may occur at several points. For example, the conditioner may be disconnected from the intermediate hitch 90 at the clevis 96, the shaft 154 including a telescopic connection permitting separation thereof as is customary. The intermediate hitch itself may be left with the conditioner and disconnected from the hitch element 88 at 170 and 176. Or the entire hitch structure, including the element 88 may be removed from the mower supporting bars 46 and 48 by separating the attachment means 106 and 108, at which time the drive chain 148 between the sprockets 86 and 146 is removed. The foregoing establishes the simplicity and ease of handling of the inventive structure. The element itself comprises relatively few parts and welded construction achieves both simplicity and strength. The mounting of the shaft 144 on the hitch bar 100 makes this a part of the hitch and separates it from the tractor and mower. The only modification of the mower that is required is the mounting of the sprocket 86 on the mower input shaft 82.

Features not categorically enumerated will undoubtedly occur to those versed in the art, as will modifications and alterations in the preferred embodiment disclosed, all of which may be achieved without departure from the invention.

What is claimed is:

1. For a tractor-mounted implement having a pair of fore-and-aft supporting members and a drive member rotatable on a fore-and-aft axis and driven by the tractor: a hitch for connecting to the implement in trailing relation thereto a second implement having a drivable part, comprising a transversely disposed hitch element adapted to span the supporting members; a pair of laterally spaced apart attachment means on said element for detachable connection respectively to the support members; a driven member journaled on the hitch element on a fore-and-aft axis and adapted to be driven by said drive member, said driven member having an output portion for driving the drivable part of the second implement; and means on the hitch element for effecting a towing connection to the second implement.

2. The invention defined in claim 1, in which: each attachment means comprises a portion on the hitch element in engagement with the respective supporting member and a U-shaped member embracing said respective supporting member and detachably connected to said element portion.

3. The invention defined in claim 1, in which: the hitch element includes a transverse bar of angular section presenting a transverse upright face; and each attachment means includes a bracket rigidly secured to said face in vertical alinement with the respective supporting member, and a cooperative hook member connected to said bracket and hooking over said respective supporting member.

4. The invention defined in claim 3, in which: said bar includes a horizontal transverse ledge; and a bearing is carried on said ledge and journals the driven member.

5. The invention defined in claim 1, in which: the means for effecting a towing connection to the second implement includes a pivot on a transverse axis, and the output portion of the driven member is proximate to said pivot.

6. For a tractor-mounted implement having a pair of fore-and-aft supporting members and a drive member rotatable on a fore-and-aft axis and driven by the tractor: a hitch for connecting to the implement in trailing relation thereto a second implement having a drivable part, comprising a transversely disposed hitch element adapted to span the supporting members and having opposite end portions; a pair of laterally spaced apart attachment means on said element for detachable connection respectively to the support members; a support plate rigid on one end portion of said element and extending rearwardly therefrom; a driven member journaled on the plate on a fore-and-aft axis and adapted to be driven by said drive member, said driven member having an output portion for driving the drivable part of the second implement; and laterally spaced apart hitch connections for the second implement, one hitch connection being mounted on said plate and the other at the opposite end portion of said element.

References Cited in the file of this patent

UNITED STATES PATENTS 2,603,050     Scheer _____ July 15, 1952